(12) United States Patent
Kasai

(10) Patent No.: US 6,246,705 B1
(45) Date of Patent: Jun. 12, 2001

(54) OPTICAL SCANNING DEVICE

(75) Inventor: Toshio Kasai, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/234,323

(22) Filed: Jan. 21, 1999

(30) Foreign Application Priority Data

Jan. 23, 1998 (JP) .................................................. 10-010897

(51) Int. Cl.[7] ...................................................... H01S 3/10
(52) U.S. Cl. ........................ 372/24; 372/26; 372/29.012; 372/29.014; 347/237; 347/247; 250/305; 250/234
(58) Field of Search ........................ 372/24, 26, 29.012, 372/29.014; 347/237, 247; 250/205, 234, 235, 236; 358/474, 475, 480, 481

(56) References Cited

U.S. PATENT DOCUMENTS 5,832,012   11/1998   Araki et al. .............................. 372/24

*Primary Examiner*—F. L. Evans
(74) *Attorney, Agent, or Firm*—Greenblum & Bernstein, P.L.C.

(57) ABSTRACT

An optical scanning device is provided with a light source that emits a light beam, a driver that controls output power and modulation of the light beam emitted by the light source, a controller that transmits, to the driver, power control data and modulation data respectively used for controlling the output power and modulation of the light beam. The optical scanning device is further provided with a single data bus that connects the driver and the controller. The power control data and the modulation data being transmitted through the single data bus at different timing.

10 Claims, 6 Drawing Sheets

FIG. 4
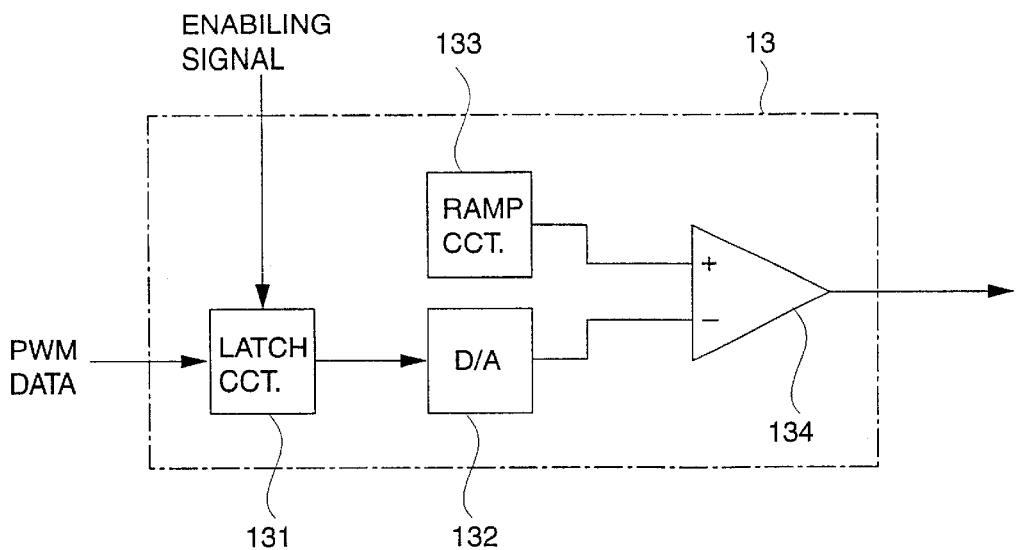
FIG. 5A
FIG. 5B
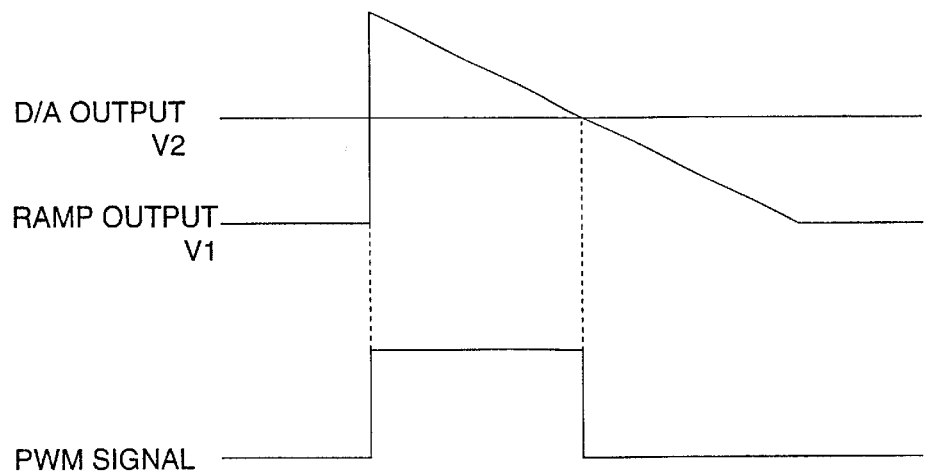

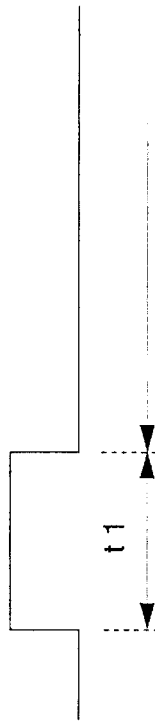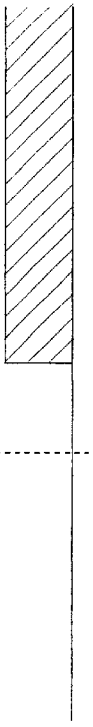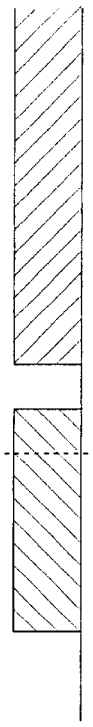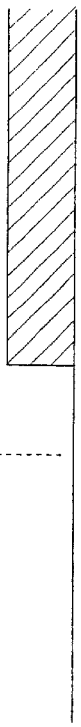
FIG. 6A ENABLING SIGNAL
FIG. 6B PWM DATA
FIG. 6C POWER CONTROL DATA
FIG. 6D DATA BUS
FIG. 6E POWER CONTROL SIGNAL
FIG. 6F PWM SIGNAL

OPTICAL SCANNING DEVICE

BACKGROUND OF THE INVENTION

The present invention relates to an optical scanning device for an imaging device such as a laser beam printer, and more particularly, to an optical scanning device having a controller for outputting control data, and a driver for driving a light source in accordance with the control data.

Conventionally, optical scanning devices have been employed in electrophotographic imaging devices.

As an example of the electrophotographic imaging devices, a laser beam printer is known, which employs an optical scanning device and forms an image, based on image data, on a recording sheet in accordance with an electrophotographic image forming process.

The optical scanning device for the laser beam printer is provided with a light source for emitting a beam; a deflector for deflecting the beam emitted by the light source to scan within a predetermined angular range; and an fθ lens which makes a spot formed, by the scanning beam, on a surface to be scanned to move at a predetermined speed. Generally, the light source includes a laser diode, and a collimator lens which converts a divergent light emitted by the laser diode to a parallel light beam.

When the optical scanning device as described above is employed in the laser beam printer, a laser beam, which is emitted by the laser diode and collimated by a collimating lens, forms a beam spot on a photoconductive drum, via the deflector such as a polygonal mirror and the fθ lens. The surface of the photoconductive drum is evenly charged, and the beam spot moves on the photoconductive drum in a direction parallel to a rotation axis thereof. While the spot moves on the photoconductive drum, the laser diode is driven, by a driver, so that the intensity of the emitted beam is varied (i.e., modulated) in accordance with imaging data. Further, the photoconductive drum is rotated about the rotation axis. The direction parallel to the rotational axis of the photoconductive drum is generally referred to as a main scanning direction, and the direction in which the photoconductive drum is rotated is referred to as an auxiliary scanning direction. Since the beam spot moves within a circumferential surface of the photoconductive drum as being modulated in accordance with the imaging data, a two-dimensional latent image is formed on the circumferential surface of the photoconductive drum.

The latent image is developed by adhering toner to form a toner image. Then, the toner image is transferred on a recording medium such as a recording sheet. The transferred toner image is then fused/pressed, and thereby fixed on the recording sheet.

In order to maintain tone density of the toner image on the photoconductive drum regardless of changes of ambient temperature, the intensity of the beam emitted by the laser diode should be controlled. Further, in order to control the gradation of the toner image, a period during which the laser diode is driven and/or the intensity of the emitted beam should also be controlled.

Generally, the intensity of the beam and modulation is controlled by a driver which is constituted as a single board, and control data used for controlling the power and modulation of the beam is generated and transmitted to the driver by a controller which is constituted as another single board. The controller board and the driver board are provided in the optical scanning device, separately and connected by a harness and including a plurality of data busses.

FIG. 1 shows a control system of a conventional optical scanning device including a controller 20A and a driver 10A. The controller 20A includes a control circuit 21, a power control data outputting circuit 22, and a modulation data outputting circuit 23.

To the control circuit 21, data representing temperature detected by a temperature sensor and imaging data representing an image to be drawn (printed) are input. The power control data outputting circuit 22, which is controlled by the control circuit 21, outputs power control data, as digital data, for changing the output power of a laser diode 2 so that a tone density of the toner image is adjusted. The modulation data outputting circuit 23, which is also controlled by the control circuit 21, outputs modulation data, as digital data, for modulating the beam emitted by the laser diode 2 based on the imaging data. In this example, the modulation data includes PWM (Pulse Width Modulation) data for controlling the width of the driving pulse of the laser diode.

The driver 10A has a power control signal outputting circuit 12 which is a D/A (digital to analog) circuit, a drive circuit 11, and a PWM signal outputting circuit 13.

The power control signal outputting circuit 12 receives the power control data which is transmitted from the power control data outputting circuit 22, through an eight-bit data bus 32, and outputs a power control signal to the drive circuit 11. The PWM signal outputting circuit 13 receives the PWM data transmitted from the PWM data outputting circuit 23 through an eight-bit data bus 33, and outputs a PWM signal to the drive circuit 11.

Further to the above an enabling signal is transmitted from the control circuit 21 to the drive circuit 11, through a control signal line 41. The drive circuit 11 controls the intensity of the emitted beam of the laser diode based on the power control signal, and modulates the emitted beam based on the PWM signal and the enabling signal.

In the conventional control system described above, in order to transmit the power control data and the PWM data, the controller 20A and the driver 10A are connected by eight-bit busses 32 and 33. This structure requires a relatively large interface unit at each of the controller 20A and the driver 10A since the number of connector pins and lines are relatively large, and further a relatively large room to accommodate such an interface unit is also necessary. Furthermore, if an imaging device is of a multi-beam type imaging device using a plurality of beams simultaneously, corresponding number of interface units should be provided in the optical scanning device, which increases the size of the device as well as a manufacturing cost.

SUMMARY OF THE INVENTION

It is therefore an object of the invention to provide an optical scanning device which has less number of data buses in comparison with the conventional optical scanning device, and still enables the device to be made smaller in size, and at less manufacturing cost.

For the above object, according to the invention, there is provided an optical scanning device which is provided with:
(a) a light source that emits a light beam;
(b) a driver that controls output power and modulation of the light beam emitted by the light source;
(c) a controller that outputs power control data and modulation data respectively used for controlling the output power and modulation of the light beam to the driver; and
(d) a single data bus that connects the driver and the controller, the power control data and the modulation data being transmitted through the single data bus at different timing.

With this structure, through the single data bus, the power control data and the modulation data can be transmitted from the controller to the driver, and the driver can control the laser diode in accordance with both the power control data and the modulation data.

Optionally, the controller may output a timing control signal and transmission of the power control data and the modulation data may be switched in accordance with the timing control signal.

Accordingly, with one control signal, operation status of the driver and the controller can be controlled.

In particular, the controller may include:
a power control data outputting circuit that outputs the power control data as digital data;
a modulation data outputting circuit that outputs the modulation data as digital data; and
a control circuit that controls data output of the power control data outputting circuit and the modulation data outputting circuit, and the driver may include:
a power control signal outputting circuit that converts the power control data to a power control signal;
a modulation signal outputting circuit that generates a modulation signal based on the modulation data; and
a drive circuit that drives the light source based on the power control signal and the modulation signal.

In this case, the power control data outputting circuit and the modulation data outputting circuit may be connected to one end of the single data bus, and the power control signal outputting circuit and the modulation signal outputting circuit may be connected to the other end of the single data bus. Further, the power control data outputting circuit and the power signal outputting circuit being made active simultaneously by the timing control signal, and the modulation control data outputting circuit and the modulation signal outputting circuit may be made active simultaneously by the timing control signal.

Thus, with a single timing control signal, operation status of the power control data outputting circuit, the power control signal outputting circuit, the modulation data outputting circuit and the modulation signal outputting circuit can be controlled, with allowing transmission of the power control data and modulation data independently.

Optionally, the timing control signal may be an enabling signal that is referred to by the drive circuit for controlling the light source.

Thus, the enabling signal which is usually referred to for turning ON or OFF the light source is also used for switching the operation status of the controller and the driver.

Specifically, the power control data outputting circuit outputs power control data representative of change of output power with respect to a reference power of the laser diode in accordance with changes of ambient conditions. In particular, the ambient conditions may include an ambient temperature.

Further, the modulation control data outputting circuit outputs modulation control data representative of image pattern to be formed.

The modulation control data represents intensity of the beam emitted by the light source or pulse width of a driving pulse applied to the light source.

As the light source, a laser diode can be used.

It should be noted that, if the light source is capable of emitting a plurality of light beams, by providing the corresponding number of data buses, each laser beam can be controlled.

DESCRIPTION OF THE ACCOMPANYING DRAWINGS

FIG. 1 a block diagram of a controller and a driver of a conventional optical scanning device;

FIG. 2 is a perspective view of main part of an optical scanning device according to an embodiment of the invention;

FIG. 3 a block diagram of a controller and a driver of the optical scanning device shown in FIG. 2;

FIG. 4 is block diagram of a PWM signal outputting circuit employed in the driver shown in FIG. 3;

FIG. 5A shows a chart illustrating relationship between output signals of a D/A converter and a ramp circuit shown in FIG. 4;

FIG. 5B is a chart showing a PWM signal output by the PWM signal outputting circuit;

FIGS. 6A through 6F show a timing chart indicating output timings of an enabling signal, PWM data (modulation control data), power control data, data transmitted through a data bus, a power control signal, a PWM signal.

DESCRIPTION OF THE EMBODIMENT

Figure 1:
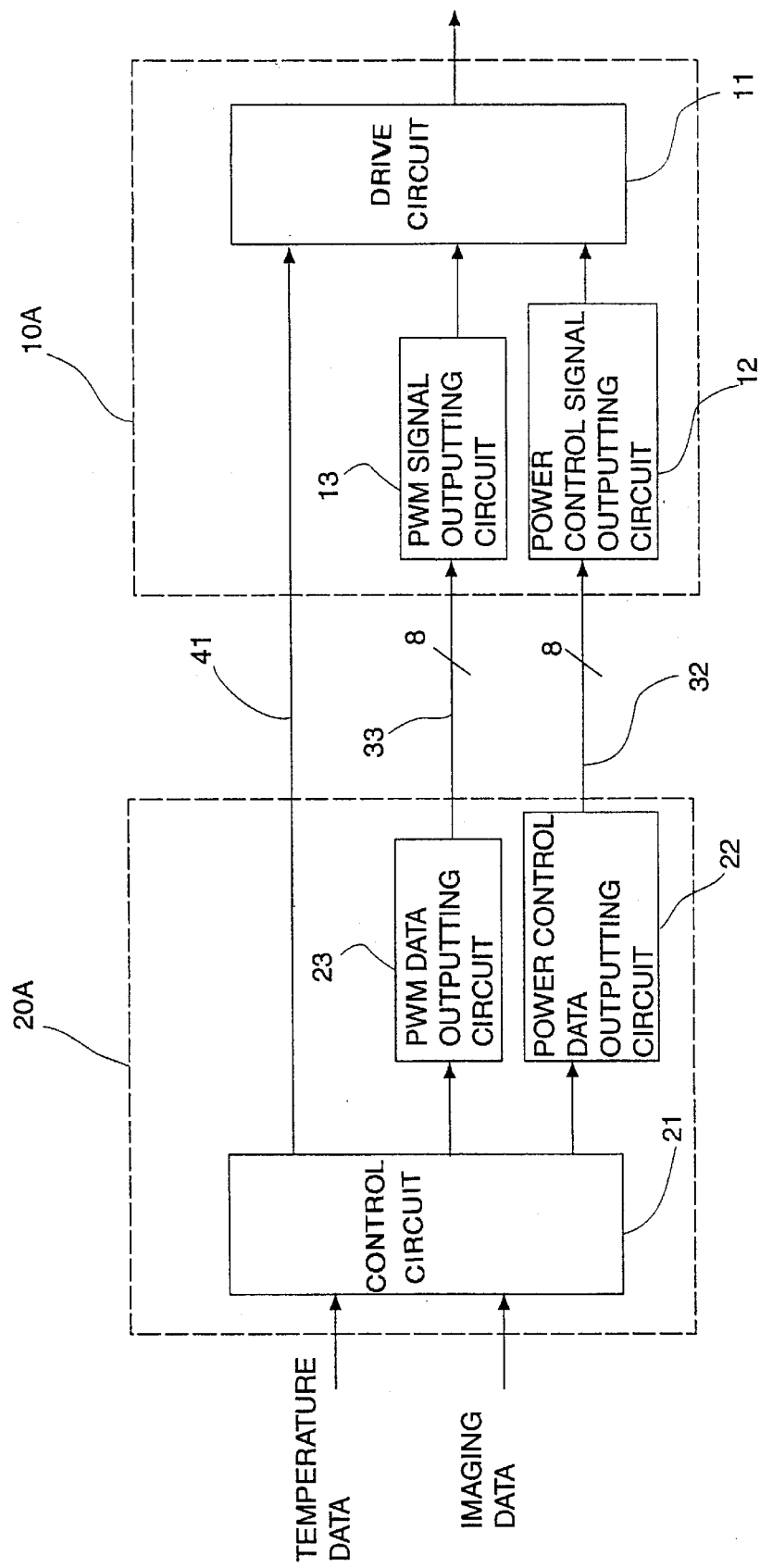
Figure 2:
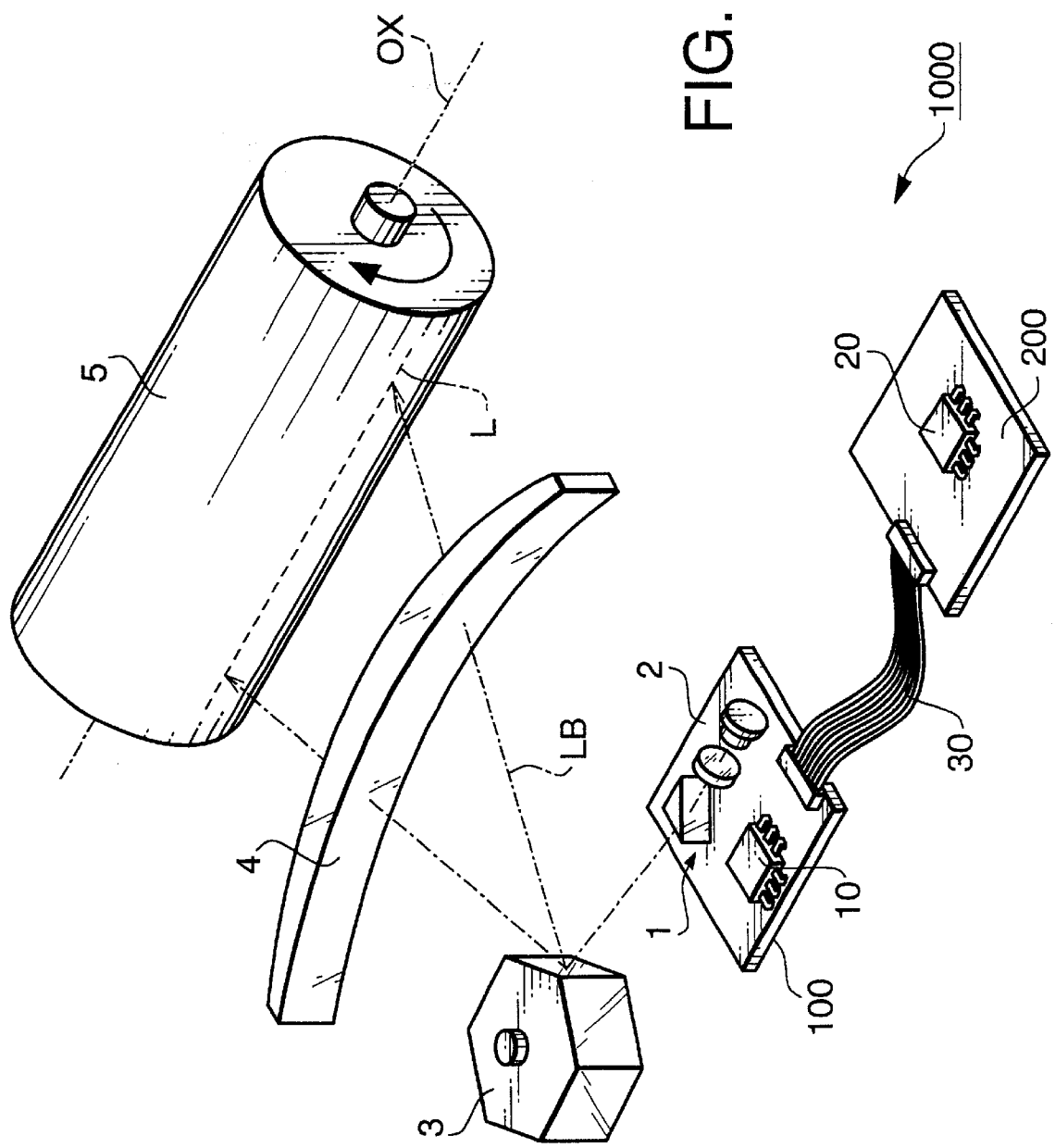

FIG. 2 is a perspective view showing a structure of an optical scanning device 1000 according to an embodiment of the invention.

The optical scanning device includes:
(a) a driver unit 100 having a board member, on which a light source unit 1 including a laser diode 2 is mounted;
(b) a controller unit 200, which is connected with the driver unit 10 by a harness 30;
(c) a polygonal mirror 3; and
(d) an fθ lens 4.

A laser beam emitted by the laser diode 2 passes through optical elements provided in the light source unit 1 and is incident on the polygonal mirror 3. The laser beam is reflected by reflection surfaces (i.e., side surfaces) of the polygonal mirror 3 and is directed to a surface to be scanned (i.e., a surface of a photoconductive drum 5 in this example) as a scanning beam LB which moves within a predetermined angular range as the polygonal mirror 3 rotates. As shown in FIG. 2, the fθ lens 4 is provided between the polygonal mirror 3 and the photoconductive drum 5 so that a beam spot formed on the circumferential surface of the photoconductive drum 5 moves linearly along a line L which is parallel with an rotational axis OX of the photoconductive drum 5 at a predetermined fixed speed.

Figure 3:
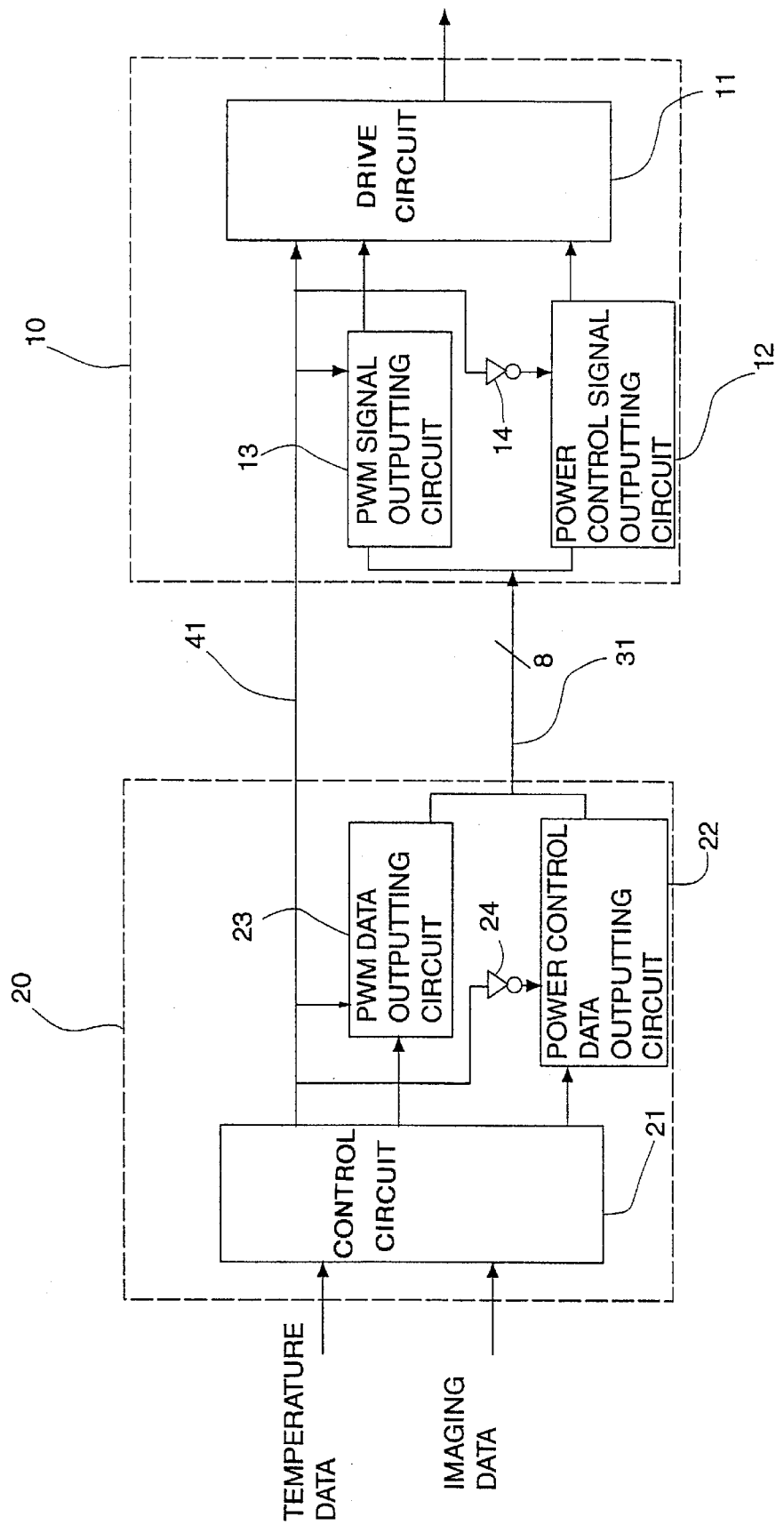

FIG. 3 is a block diagram showing a constitution of a control system including a driver 10 and a controller 20. Similarly to the conventional optical scanning device, the controller 20 outputs the power control data and PWM data (i.e., the modulation data), and the driver 10 controls the power and modulation of the laser beam based on the power control data and the PWM data. The driver 10 is allowed to drive the laser diode only when the enabling signal transmitted from the controller 20 is LOW (i.e., the laser diode 2 can be driven to emit the laser beam only when the enabling signal is LOW), and the modulation of the laser beam is controlled based on the signal output by the PWM circuit.

The controller 20 includes a control circuit 21, a power control data outputting circuit 22, and a modulation data outputting circuit 23.

To the control circuit 21, temperature data representing ambient temperature detected by a temperature sensor, and imaging data representing an image to be drawn (printed) are input. The power control data outputting circuit 22, which is controlled by the control circuit 21, outputs power control data, as digital data, for changing the power of the laser beam output by a laser diode 2 in accordance with temperature change by modifying reference data. The modulation data outputting circuit 23, which is also controlled by the control circuit 21, outputs modulation data, as digital data, for modulating the beam emitted by the laser diode 2 based on the imaging data. In this embodiment, the modulation data includes PWM (Pulse Width Modulation) data for controlling the width of the driving pulse of the laser diode. It should be noted that, in order to obtain gradation image, it is also possible to vary the intensity of the emitted beam in accordance with the imaging data.

Each of the power control data outputting circuit 22 and the PWM data outputting circuit 23 has an input terminal for receiving an enabling signal. When the enabling signal is LOW, each of the power control data outputting circuit 22 and the PWM data outputting circuit 23 is allowed to output data, and when the enabling signal is in HIGH, the output of the signal is inhibited.

The control circuit 21 outputs the enabling signal through a control line 41. The enabling signal input terminal of the power control data outputting circuit 22 is connected to the control line 41 through an inverter 24, while the enabling signal input terminal of the PWM data outputting circuit 23 is connected to the control line 41 directly. Further, an 8-bit signal output terminal of the power control data outputting circuit 22 and an 8-bit signal output terminal of the PWM data outputting circuit 23 are connected to a common 8-bit data bus 31 as shown in FIG. 3.

The driver 10 has a power control signal outputting circuit 12, which is a D/A (digital to analog) circuit; a drive circuit 11, and a PWM signal outputting circuit 13. The power control signal outputting circuit 12 receives the power control data which is output by the power control data outputting circuit 22, through the 8-bit data bus 31, and outputs a power control signal to the drive circuit 11. The PWM signal outputting circuit 13 receives the PWM data, which is output by the PWM data outputting circuit 23, through the 8-bit data bus 31, and outputs a PWM signal to the drive circuit 11. The power control signal outputting circuit 12 and the PWM signal outputting circuit 13 have input terminals for receiving the enabling signal transmitted by the control circuit 21 through the control signal line 41. The input terminal of the power control signal outputting circuit 12 is connected to the control signal line 41 via an inverter 14, and the input terminal of the PWM signal outputting circuit 13 is connected to the control signal line 41 directly. It should be noted that each of the power control signal outputting circuit 12 and the PWM signal outputting circuit 13 is constituted to output the data when the input enabling signal is in LOW status.

FIG. 4 is a block diagram of an example of the PWM signal outputting circuit 13. The PWM signal outputting circuit 13 includes a latch circuit 131 which latches the PWM data when the enabling signal input thereto is LOW; a D/A converter 132 which converts the latched PWM data into an analog voltage signal (a PWM voltage signal); a ramp signal generating circuit 133; and a comparator 134 which compares the PWM voltage signal with a ramp signal output by the ramp signal generating circuit 133. The comparator 134 outputs a HIGH signal when the PWM voltage signal is smaller than the ramp signal, and a LOW signal when the PWM voltage signal is not smaller than the ramp signal.

FIGS. 5A and 5B show a relationship between the ramp signal, PWM voltage signal (FIG. 5A), and the output signal of the comparator 134 (i.e., the output signal of the PWM circuit 13) (FIG. 5B).

FIGS. 6A through 6F show a timing chart showing output timings of signals used for controlling the optical scanning device 1000. FIG. 6A shows an output timing of the enabling signal; FIG. 6B shows an output timing of the PWM data output by the PWM data outputting circuit 23; FIG. 6C shows an output timing of the power control data output by the power control data outputting circuit 22; FIG. 6D shows transmission timing of signals through the data bus 31; FIG. 6E shows an operation timing of the power control signal outputting circuit 12; and FIG. 6F shows an operation timing of the PWM signal outputting circuit 13.

In the controller 20, the temperature detected by the temperature sensor and the imaging data are input in the control circuit 21. Accordingly, the power control data outputting circuit 22 and the PWM data outputting circuit 23 are controlled firstly. The power control data outputting circuit 22 generates power control data which is used for modifying the reference power so as to correspond to the change of the sensitivity of the photoconductive drum 5 due to the change of the ambient temperature. The PWM data outputting circuit 23 generates the PWM data which is used for controlling the light emitting period of the laser diode 2 in accordance with the imaging data. During this period (i.e., period t1), the control circuit 21 sets the enabling signal to HIGH level. When the enabling signal is HIGH, the LOW level signal is input, through the inverter 24, to the power control data outputting circuit 22, and thus the power control data is transmitted from the power control data outputting circuit 22 to the data bus 31. During this period (t1), since the enabling signal input to the PWM data outputting circuit 23 is HIGH, the PWM data is not output to the data bus 31.

While the enabling signal is LOW (i.e., during period t1), the power control signal outputting circuit 12 is active. Thus, the power control signal outputting circuit 12 receives the power control data transmitted through the data bus 31, converts the same into the analog power control signal, and transmits to the drive circuit 11. The drive circuit 11, based on the power control signal, changes a reference value for controlling a power of the emitted beam of the laser diode 2. In accordance with the change of the reference value, an APC (Automatic Power Control) circuit included in the drive circuit 11 controls the intensity of the beam emitted by the laser diode 2. During period t1, the PWM signal outputting circuit 13 does not operate, and accordingly, the power control data is not received through the data bus 31.

After period t1 has passed, the control circuit 21 sets the enabling signal to LOW level. Then, the signal transmitted to the power control data outputting circuit 22 through the inverter 24 turns to HIGH level, and the power control data outputting circuit 22 becomes, after a certain delay, non-active. To the PWM data outputting circuit 23, the LOW level signal is input, and accordingly the PWM data outputting circuit 23 becomes active. Thus, after a certain delay, the PWM data outputting circuit 23 outputs the PWM data to the data bus 31. It should be noted that the control unit 20 is configured such that the PWM data is output after the power control data outputting circuit 22 becomes non-operative. Therefore, when the power control data outputting circuit 22 outputs the power control data, only the power control data is transmitted through the data bus 31; and when the PWM data outputting circuit 23 outputs the PWM data, only the PWM data is transmitted through the data bus 31.

In the driver 10, when the enabling signal is LOW, the HIGH level signal is input to the power control signal outputting circuit 12, since the enabling signal is input to the power control signal outputting circuit 12 through the inverter 14. Thus, the power control signal outputting circuit 12 becomes non-active. At this stage, the PWM signal outputting circuit 13 becomes active, and receives the PWM data transmitted through the data bus 31. The drive circuit 11 is also active at this stage, and is ready to make the laser diode to emit a beam.

In the PWM signal outputting circuit 13, as shown in FIG. 4, the PWM data is latched by the latch circuit 131, and then converted into an analog signal by the D/A converter 132 to output a PWM voltage. As described above, the PWM voltage is compared with the ramp voltage at the comparator 134 to output the PWM signal which has a pulse width corresponding to the PWM data. The PWM signal is transmitted to the drive circuit 11, which controls the laser diode to emit a modulated beam in accordance with the width of the PWM signal.

As described above, in the controller unit 20, the power control data outputting circuit 22 and the PWM data outputting circuit 23 are made active selectively, in accordance with the status of the enabling signal output by the control circuit 21. The power control signal outputting circuit 12 and the PWM signal outputting circuit 13 are also made active selectively, synchronously with the operation status of the power control data outputting circuit 22 and the PWM data outputting circuit 23. Thus, the power control data and the PWM data (i.e., the modulation control data) are transmitted through the data bus 31 at a different timing. Accordingly, in the optical scanning device described above, the power control data and the PWM data are transmitted through the common data bus, from the controller to the driver, with allowing the power control and the PWM control to be performed independently. Since the controller 20 and the driver 10 are connected with a single 8-bit data bus 31, interfaces can be simplified, the number of connectors and pins can be reduced, a room for wiring can be made small, and a room for accommodating the circuit boards can also be made small. Thus, the optical scanning device can be made compact.

Figure 7:
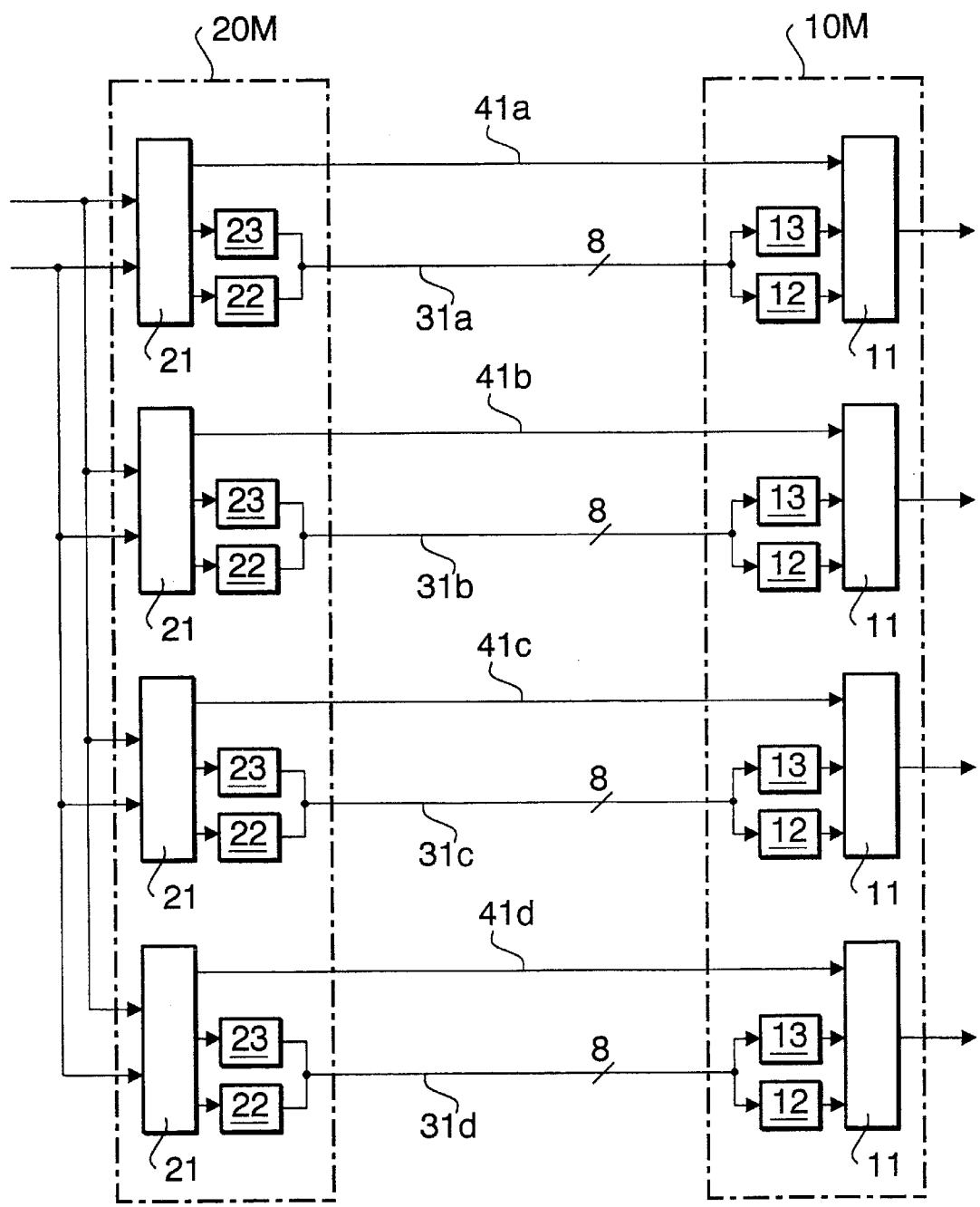
FIG. 7 shows a structure of the controller and driver for a multi-beam imaging device.

FIG. 7 is a block diagram showing a controller 20M and driver 10M for four-beam type optical scanning device which is an example of a multi-beam optical scanning device. As shown in FIG. 7, for each beam, a set of a control circuit 21, a power control data outputting circuit 22, a PWM data outputting circuit 23 are provided in the controller 20M. Corresponding to the controller 20M, four sets of a power control signal outputting circuit 12, a PWM signal outputting circuit 13 and a drive circuit 11 are provided in the driver 10M. As shown in FIG. 7, the control circuits 21 and the drive circuits 11 are connected with enabling signal lines 41a–41d, respectively. Further, the four sets of the power control data outputting circuits 22 and the PWM data outputting circuit 23, and the power signal outputting circuits 12 and the PWM signal outputting circuits 13 are connected to four 8-bit data busses 31a–31d, respectively. Thus, for four beam type optical scanning device, only four 8-bits data busses are sufficient.

Since the number of the data buses is greatly reduced in comparison with the conventional optical scanning device, where two 8-bit data buses are required for one beam, the optical scanning device can be made compact, and the structure can be simplified, which reduces the manufacturing cost.

In the above-described embodiments, for modulating the beam, the PWM data is used. Instead of the PWM data, various types of data such as PAM data or PCM data can be used.

Further, each of the power control data outputting circuit, the PWM data outputting circuit, the power control signal outputting circuit, and the PWM signal outputting circuit can be configured to be active when the HIGH level enabling signal is applied. In such a case, by modifying the constitution of the drive unit appropriately, e.g., by arranging inverters appropriately, the similar function can be achieved.

The present disclosure relates to the subject matter contained in Japanese Patent Application No. HEI 10-010897, filed on Jan. 23, 1998, which is expressly incorporated herein by reference in its entirety.

What is claimed is:

1. An optical scanning device, comprising:

a light source that emits a light beam;

a driver that controls output power and modulation of the light beam emitted by said light source;

a controller that outputs power control data and modulation data respectively used for controlling the output power and modulation of the light beam to said driver; and a single data bus that connects said driver and said controller, said power control data and said modulation data being transmitted through said single data bus at different timing.

2. The optical scanning device according to claim 1, wherein said controller outputs a timing control signal, transmission of said power control data and said modulation data being switched in accordance with said timing control signal.

3. The optical scanning device according to claim 2, said controller including:

a power control data outputting circuit that outputs said power control data as digital data;

a modulation data outputting circuit that outputs said modulation data as digital data; and a control circuit that controls data output of said power control data outputting circuit and said modulation data outputting circuit, said driver including:

a power control signal outputting circuit that converts said power control data to a power control signal;

a modulation signal outputting circuit that generates a modulation signal based on said modulation data; and a drive circuit that drives said light source based on said power control signal and said modulation signal, said power control data outputting circuit and said modulation data outputting circuit being connected to an end of said single data bus, said power control signal outputting circuit and said modulation signal outputting circuit being connected to the other end of said single data bus, said power control data outputting circuit and said power signal outputting circuit being made active simultaneously by said timing control signal, and said modulation control data outputting circuit and said modulation signal outputting circuit being made active simultaneously by said timing control signal.

4. The optical scanning device according to claim 3, wherein said timing control signal comprises an enabling signal that is referred to by said drive circuit for controlling said light source.

5. The optical scanning device according to claim 3, wherein said power control data outputting circuit outputs power control data representative of change of output power with respect to a reference power of said laser diode in accordance with changes of ambient conditions.

6. The optical scanning device according to claim 5, wherein said ambient conditions include an ambient temperature.

7. The optical scanning device according to claim 3, wherein said modulation control data outputting circuit outputs modulation control data representative of image pattern to be formed.

8. The optical scanning device according to claim 7, wherein said modulation control data represents one of intensity of the beam emitted by said light source and a pulse width of a driving pulse applied to said light source.

9. The optical scanning device according to claim 1, wherein said light source comprises a laser diode.

10. An optical scanning device, comprising:

a light source that emits a plurality of light beams;

a driver that controls output power and modulation of each of the light beams emitted by said light source;

a controller that outputs, to said driver, power control data and modulation data respectively used for controlling the output power and modulation of each of the light beams; and a plurality of data buses that connect said driver and said controller, said power control data and said modulation data corresponding to said plurality of light beams being transmitted through said plurality of data buses, respectively, said power control data and said modulation data being transmitted at different timing in each of said data busses.

* * * * *